United States Patent [19]

Sells

[11] Patent Number: 5,632,356
[45] Date of Patent: May 27, 1997

[54] CABLE LUBRICATING DEVICE AND METHOD

[76] Inventor: Dan W. Sells, 6005 Wittig Ave., Las Vegas, Nev. 89131

[21] Appl. No.: 508,798

[22] Filed: Aug. 28, 1995

[51] Int. Cl.$^6$ ........................................ F16W 7/16
[52] U.S. Cl. ........................ 184/15.2; 184/15.1
[58] Field of Search ..................... 184/15.1, 15.2, 184/15.3, 16, 17; 254/134.3 FT

[56] References Cited

U.S. PATENT DOCUMENTS

| | | | |
|---|---|---|---|
| 3,565,213 | 2/1971 | Heller | 184/15.1 |
| 3,783,972 | 1/1974 | Molstad | 184/15.1 |
| 4,063,617 | 12/1977 | Shenk | 184/15.1 |
| 4,069,894 | 1/1978 | Black | 184/15.1 |
| 4,275,096 | 6/1981 | Taylor | 184/18 |
| 4,552,676 | 11/1985 | Norris | 252/20 |
| 4,569,420 | 2/1986 | Pickett et al. | 184/15.1 |
| 4,688,762 | 8/1987 | DeBeradinis | 254/134.3 |
| 4,749,059 | 6/1988 | Jonnes et al. | 184/15.1 |
| 5,324,006 | 6/1994 | Pickrell | 254/134.3 |
| 5,326,292 | 7/1994 | Brushaber | 184/15.1 |

Primary Examiner—Thomas E. Denion
Attorney, Agent, or Firm—Joseph N. Breaux

[57] ABSTRACT

A cable lubricating device and method, for use in cable through conduit pulling operations. The automatic cable lubricating device includes a lubricant supply tank having an internal chamber and a regulating means for regulating the flow of a pressurized lubricant from within its internal chamber, a lubricant dispensing head having a cable feeding aperture therethrough and a plurality of lubricating ports, and a flexible lubricant supply hose having a first and second end. The dispensing head further includes an input port. The first end of the supply hose has a connecting means for connecting to the regulating means downstream of the supply tank. The second end of the supply hose has a connecting means for connecting to the dispensing head input port such that a lubricant under pressure stored within the internal chamber of the supply tank may be dispensed through the lubricating ports. The regulating means may be adjusted to control the output of lubricant from the lubricating ports. The dispensing head includes a conduit attachment means for attaching the dispensing head to a conduit such that in use the lubricating ports dispense the lubricant into the conduit so attached.

4 Claims, 3 Drawing Sheets

5,632,356

CABLE LUBRICATING DEVICE AND METHOD

TECHNICAL FIELD

The present invention relates to devices and methods for lubricating cable to be run through conduit and more particularly to devices and methods for lubricating cable to be run through conduit that utilizes a pressurized lubricating tank and screw on lubricating head.

BACKGROUND ART

Construction projects often require that electrical wiring be run through conduit. The conduit runs may be extremely long and include numerous bends in which high frictional forces are developed between the cable and conduit as the cable is pulled through the conduit. It is common to lubricate the cable as it enters the conduit to reduce these frictional forces. The conventional technique is for one electrician or helper to apply a generous amount of lubricant to the cable while simultaneously feeding the cable at the point of entry into the conduit run while a second electrician or helper pulls the cable through the conduit from the opposite end of the run. The application of lubricant in this manner is both messy and inefficient. The electrician or helper applying the lubricant invariably gets the lubricant on his hands thereby hindering his ability to feed the cable.

It would be a benefit therefore to provide a device for applying lubricant to a cable prior to its being run through conduit which does not interfere with the cable feeding operation, is safe and economical, reduces the manpower requirement of lubricating cable and is less messy.

GENERAL SUMMARY DISCUSSION OF INVENTION

It is thus an object of the invention to provide a automatic cable lubricating device that which will eliminate an electricians contact with the lubricant used in cable pulling operations.

It is a further object of the invention to provide a automatic cable lubricating device that provides a continuous application of lubricant to a cable as it is pulled through conduit.

It is a still further object of the invention to provide a automatic cable lubricating device that is delivers lubricant to a cable with less mess and less waste of lubricant.

It is a still further object of the invention to provide a automatic cable lubricating device that is "hands free" once installed onto the conduit through which the cable will be run.

Accordingly, an automatic cable lubricating device, for use in cable through conduit pulling operations is provided. The automatic cable lubricating device includes a lubricant supply tank having an internal chamber; a lubricant dispensing head having a cable feeding aperture therethrough, an input port and a plurality of lubricating ports; and a flexible lubricant supply hose having a first and second end. The supply tank may further include a regulating means for regulating the flow of a pressurized lubricant containable within the supply tank.

The first end of the supply hose has a connecting means for connecting to the supply tank. The second end of the supply hose has a connecting means for connecting to the dispensing head input port such that a lubricant contained within the supply tank may be dispensed through the lubricating ports. The supply hose may be connected downstream of the supply tank regulating means such that a lubricant under pressure stored within the internal chamber of the supply tank may be dispensed through the lubricating ports. The regulating means may be adjusted to control the output of lubricant from the lubricating ports. In an alternative embodiment lubricant may be gravity fed to the lubricating ports by positioning the supply tank above the dispensing head while in use. Lubricant would exit the supply tank from the bottom and be transported by the supply hose to the dispensing head. In another embodiment a mechanical pump means may be utilized to urge the lubricant contained within the supply tank to the dispensing head.

The dispensing head includes a conduit attachment means for attaching the dispensing head to a conduit such that in use the lubricating ports dispense the lubricant into the conduit so attached. The conduit attachment means may be a clamp mechanism. Preferable the attachment means includes a internally threaded bore into which a conduit may be attached. The threaded bore may be of various sizes to accommodate all types of common conduit sizes. The attachement means may have an internally threaded bore with a multiplicity of thread diameters such that one dispensing head may be readily attachable to a variety of conduit diameters. The internal thread profile may be stair stepped as is commonly known in the art to accommodate various thread diameters within a single bore.

The lubricating ports may take many shapes. The lubricating ports may be spaced uniformly about the dispensing head cable feeding aperture. The lubricating ports and cable feeding aperture have parallel longitudinal axes. The lubricating ports are interconnected via an internal chamber and are in fluid communication with the dispensing head input port. Lubricant supplied via the supply hose to the dispensing head input port exits the dispensing head through the lubricating ports. The lubricating ports are oriented such that the lubricant is directed within the conduit when the automatic cable lubricating device is in use. As the electric cable is inserted through the cable feeding aperture into the conduit, lubricant from the ports contacts the cable and conduit interior reducing frictional forces that develop between the cable and conduit wall.

Preferably the lubricant supply hose first and second end connecting means are operable by hand. The connecting means may be any number of commonly known quick connect types which are leak proof at the operating pressure downstream of the regulating means of the supply tank. The connecting means may be externally threaded upset ends as is commonly found on garden hoses. An alternative connecting means may be such as found on common pneumatic tools.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
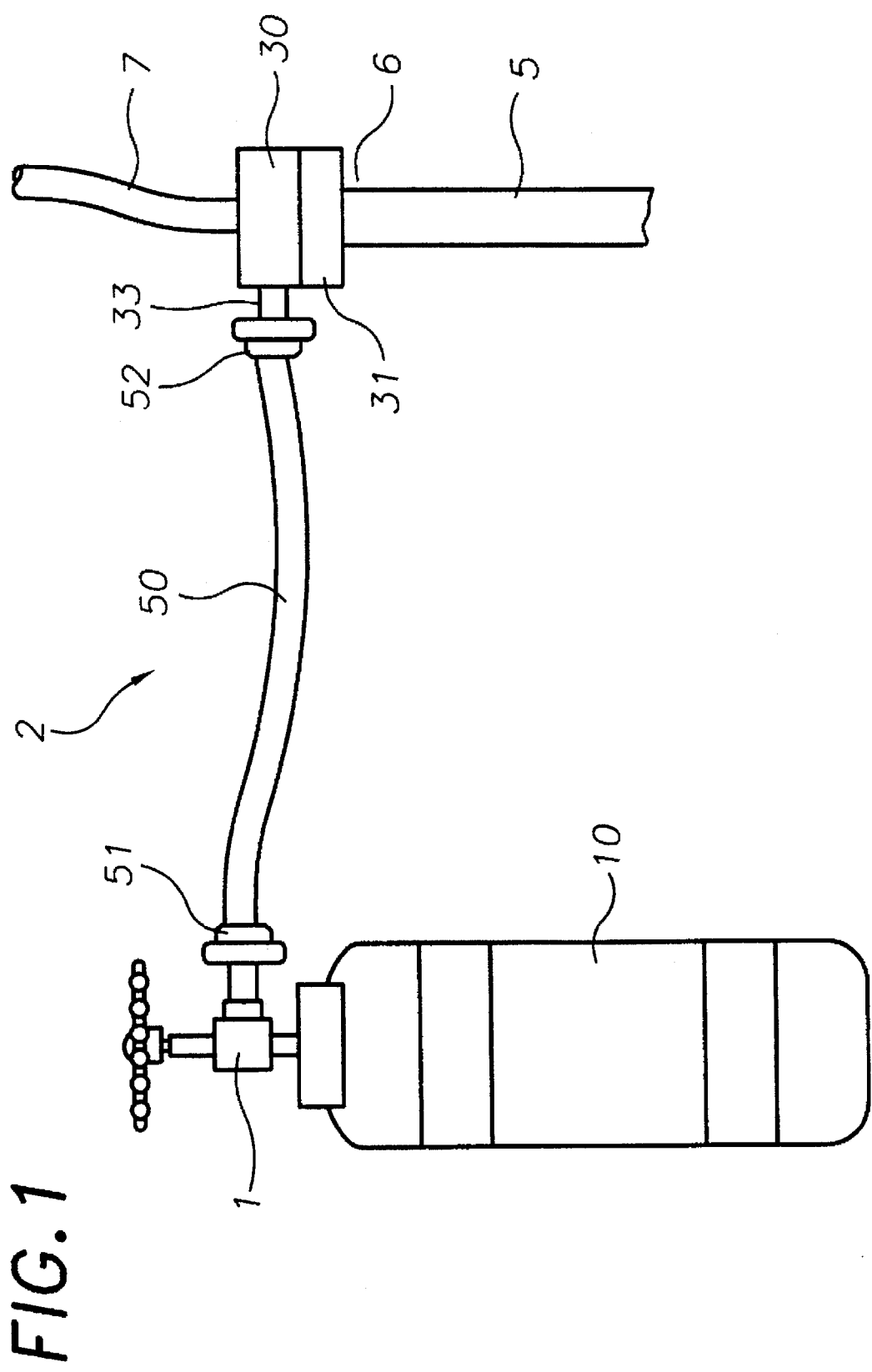
FIG. 1 is a side view of an exemplary embodiment of the automatic lubricating device.

Referring to the drawings, FIG. 1 depicts an exemplary embodiment of the automatic lubricating device generally referenced by the number 2, in use with a representative conduit 5 and a representative electric cable 7. Automatic lubricating device 2 includes a lubricant supply container 10 having a regulator valve 11, supply hose 50, and dispensing head 30 having an input port 33. Supply hose 50 has a first end 51 and second end 52. In the exemplary embodiment first end 51 and second end 52 have an externally threaded upset which is connectable to regulating valve 11 and input port 33 respectively. Dispensing head 30 includes an internally threaded attachment collar 31. Representative conduit 5 has external threads 6 on end which are threaded within attachment collar 31 when the automatic lubricating device 2 is in use.

Figure 2:
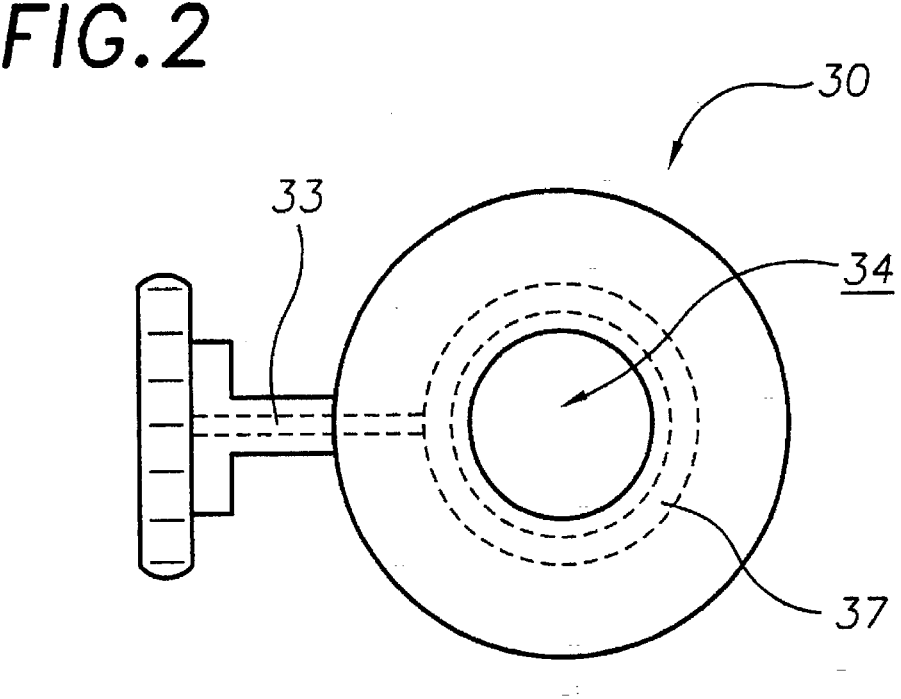
FIG. 2 is a top view of the dispensing head of the exemplary embodiment of the automatic lubricating device shown in FIG. 1.
Figure 3:
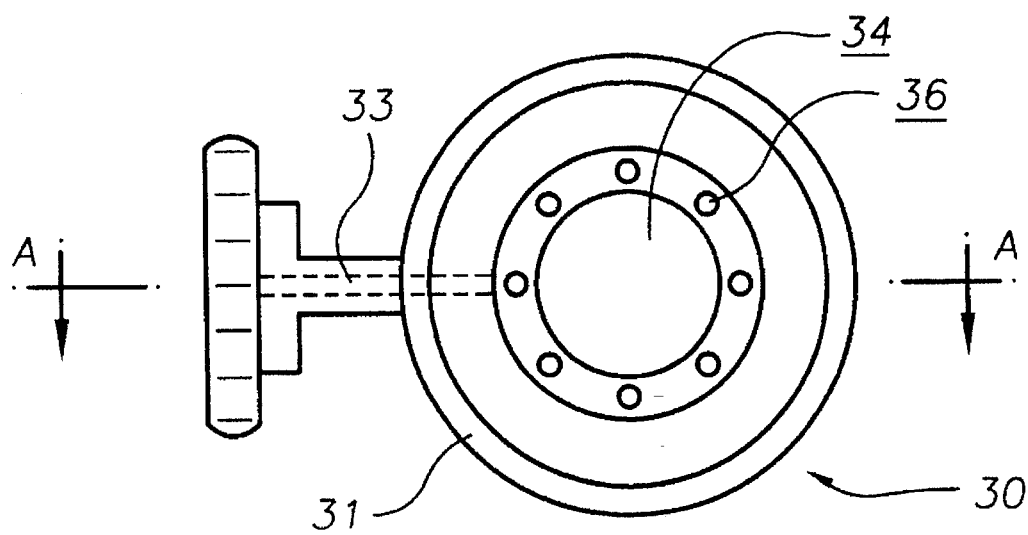
FIG. 3 is a bottom view of the exemplary embodiment of the dispensing head of FIG. 2.

FIG. 2 is a top view of dispensing head 30. Dispensing head 30 has input port 33. Input port 33 is in fluid communication with a connecting chamber 37 (hidden) and lubricating ports 36 (FIG. 3). A cable feeding aperture 34 passes through dispensing head 30.

FIG. 3 is a bottom view of dispensing head 30. Dispensing head 30 includes eight lubricating ports 36 in parallel alignment with aperture 34. Lubricating ports 34 are in fluid communication with input port 33 and connecting chamber 37 (FIG. 2). Attachment collar 31 is in parallel alignment with lubricating ports 36 and aperture 34. Attachement collar 31 is internally threaded.

Figure 4:
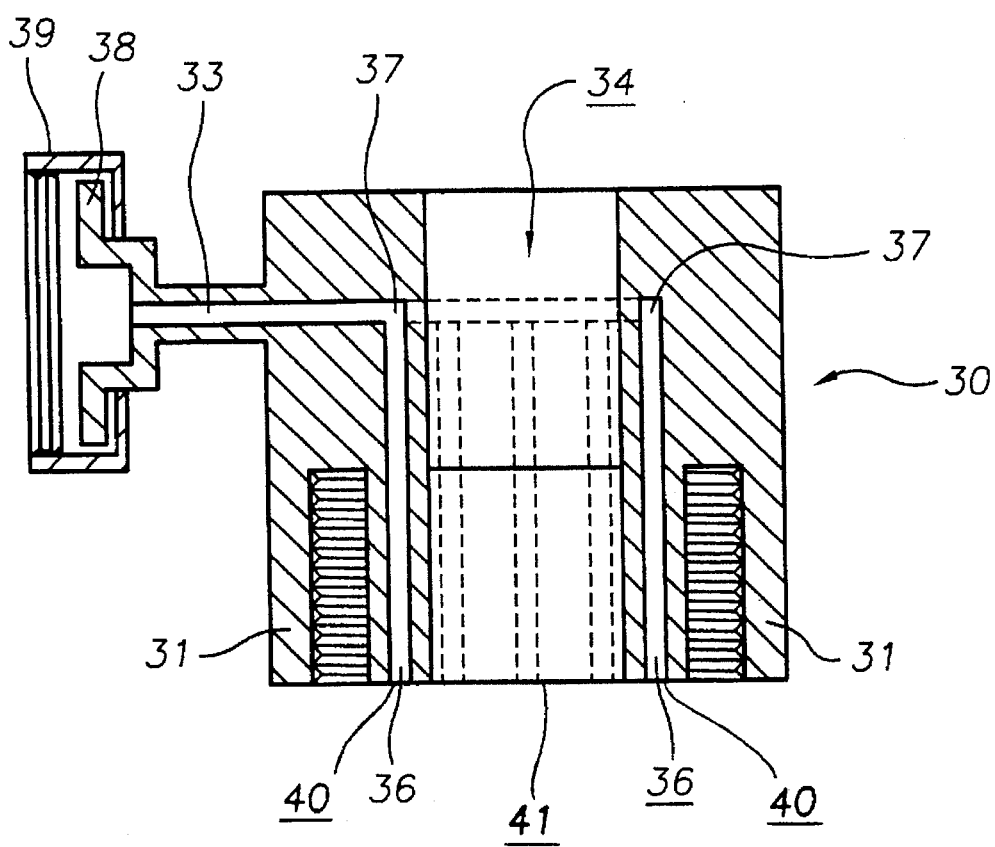
FIG. 4 is a cross section A—A of the exemplary embodiment of the dispensing head of FIG. 3

FIG. 4 is a cross section A—A of FIG. 3 illustrating the dispensing head 30. Lubricating ports 36 are interconnected within dispensing head 30 by connecting chamber 37. Attachment collar 31 terminates flush with terminal end opening 40 of lubricating ports 36 and a terminal end opening 41 of aperture 34. Input port 33 includes a connecting flange 38 having a circular rotatable connecting collar 39 disposed thereabout as is commonly utilized to connect to a hose having an externally threaded upset end.

Operation of automatic lubricating device 2 is now described with reference to the aforementioned FIGS. Supply tank 10 is filled with a pressurized lubricant. Supply hose first end 51 is attached to regulating means 11. Dispensing head 30 is positioned above a conduit 5 through which a cable 7 is to be pulled. Attachment collar 31 is threaded onto conduit 5 at threaded end 6. Supply hose second end 52 is attached to input port 33. Regulating means 11 is opened to allow the pressurized lubricant to leave container 10 and flow through supply hose 50 to input port 33. Lubricant flows from input port 33 into connecting chamber 37 and lubricating ports 36. Lubricant exits lubricating ports 36 into conduit 5. Wire 7 is forced through aperture 34 into lubricant laden conduit 5.

It can be seen from the preceding description that a method and device for lubricating cable to be run through conduit which eliminates an electricians contact with the lubricant itself, provides a continuous source of lubricant with a minimal amount of waste and mess, and does not require constant monitoring has been provided.

It is noted that the embodiment of the automatic cable lubricating device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A cable lubricating device comprising:

a lubricant supply tank having a refillable internal chamber;

a lubricant dispensing head having an input port, a cable feeding aperture therethrough and a plurality of lubricating ports; and a flexible lubricant supply hose having a first end and a second and, said first end having a connecting means for connecting to said input port of said dispensing head, said second end being connectable to said internal chamber of said lubricant supply tank;

said lubricant dispensing head including a conduit attachment means for attaching said dispensing head to a conduit, said attachment means forming an attachment to the conduit in a manner such that in use terminal end openings of said lubricating ports are positioned within said conduit and dispense a lubricant within said conduit.

2. The cable lubricating device of claim 1 wherein:

said conduit attachment means includes a threaded inner bore such that in use a conduit having an externally threaded end may be removably attached to said dispensing head.

3. The cable lubricating device of claim 2, wherein:

said lubricating ports are cylindrical in shape and are spaced uniformly about said cable feeding aperture, said lubricating ports and said cable feeding aperture having parallel longitudinal axes within said dispensing head.

4. A lubricating device comprising:

a lubricant supply tank having a refillable internal chamber;

a lubricant dispensing head having a cable feed aperture formed through the center thereof, an input port, a connecting chamber formed within said lubricant dispensing head in fluid communication with said input port, a plurality of cylindrically shaped lubricating ports in fluid communication with said connecting chamber and spaced uniformly about said cable feed aperture, and an internally threaded attachment collar for connection to a threaded end of a conduit section, said attachment collar, said plurality of lubricating ports and said cable feed aperture terminating in a flush configuration in a manner such that when said attachment collar is threaded onto the threaded end of the section of conduit lubricant exiting said plurality of lubricating ports is dispensed directly within the conduit, said feed aperture and said plurality of lubricating ports having substantially parallel longitudinal axes; and a flexible lubricant supply hose having a first end and a second end, said first end having a connecting means for connecting to said input port of said dispensing head, said second end being connectable to said internal chamber of said lubricant supply tank.

* * * * *